United States Patent
Gaudet

(10) Patent No.: US 6,952,738 B1
(45) Date of Patent: Oct. 4, 2005

(54) SYSTEMS AND METHODS FOR REMOVING INTRAPACKET GAPS FROM STREAMS OF DIFFERENT BANDWIDTHS

(75) Inventor: Brian Gaudet, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 675 days.

(21) Appl. No.: 09/931,045

(22) Filed: Aug. 17, 2001

(51) Int. Cl.[7] ............................................. G06F 15/16
(52) U.S. Cl. ...................... 709/231; 709/237; 709/238; 719/311; 370/389; 370/471
(58) Field of Search ............................... 709/231, 310, 709/238, 237; 370/389, 471; 719/311

(56) References Cited

U.S. PATENT DOCUMENTS

| | | | | |
|---|---|---|---|---|
| 5,638,367 A | * | 6/1997 | Gaytan et al. | 370/471 |
| 5,648,960 A | * | 7/1997 | Sakazaki et al. | 370/498 |
| 5,781,549 A | * | 7/1998 | Dai | 370/398 |
| 5,905,725 A | * | 5/1999 | Sindhu et al. | 370/389 |
| 6,154,460 A | * | 11/2000 | Kerns et al. | 370/398 |
| 6,480,489 B1 | * | 11/2002 | Muller et al. | 370/389 |
| 6,763,025 B2 | * | 7/2004 | Leatherbury et al. | 370/395.64 |
| 6,763,390 B1 | * | 7/2004 | Kovacevic et al. | 709/231 |
| 2001/0049744 A1 | * | 12/2001 | Hussey et al. | 709/238 |
| 2002/0003795 A1 | * | 1/2002 | Oskouy et al. | 370/389 |
| 2002/0162114 A1 | * | 10/2002 | Bisher et al. | 725/91 |

\* cited by examiner

*Primary Examiner*—Nabil El-Hady
(74) *Attorney, Agent, or Firm*—Harrity & Snyder, LLP

(57) ABSTRACT

A system for removing gaps from streams of packets is provided. The system includes a packet splitter, a header buffer, a data buffer, and a packet combiner. The packet splitter receives the packets. Each of the packets includes a packet header and packet data. The packet splitter separates the packet header from the packet data for each of the packets. The header buffer stores the packet headers and the data buffer stores the packet data. The packet combiner reassembles the packets from the packet headers in the header buffer and the packet data in the data buffer and removes gaps from the reassembled packets.

31 Claims, 10 Drawing Sheets

SYSTEMS AND METHODS FOR REMOVING INTRAPACKET GAPS FROM STREAMS OF DIFFERENT BANDWIDTHS

BACKGROUND OF THE INVENTION

1. Field of the Invention

The present invention relates generally to data transfer and, more particularly, to systems and methods for removing gaps from data streams.

2. Description of Related Art

Routers receive data on a physical media, such as optical fiber, analyze the data to determine its destination, and output the data on a physical media in accordance with the destination. Routers were initially designed using a general purpose processor executing large software programs. As line rates and traffic volume increased, however, general purpose processors could not scale to meet the new demands. For example, as new functions, such as accounting and policing functionality, were added to the software, these routers suffered performance degradation. In some instances, the routers failed to handle traffic at line rate when the new functionality was turned on.

To meet the new demands, purpose-built routers were designed. Purpose-built routers were designed and built with components optimized for routing. They not only handled higher line rates and higher network traffic volume, but they also added functionality without compromising line rate performance.

A conventional purpose-built router may include a number of input and output ports from which it receives and transmits streams of information packets. A switching fabric may be implemented in the router to carry the packets between the ports. In a high-performance purpose-built router, the switching fabric may transmit a large amount of information between a number of internal components.

Conventional routers are typically configured to handle packets transmitted within streams of variable bandwidths. Usually, the conventional routers process the packets. Processing of the packets sometimes introduces gaps into the packets.

As a result, there is a need for systems and methods that remove gaps from packets within streams of any bandwidth.

SUMMARY OF THE INVENTION

Systems and methods consistent with the principles of the invention address this and other needs by providing logic that removes gaps in packets while sharing logic between streams.

According to one aspect of the present invention, a system for removing gaps from streams of packets is provided. The system includes a packet splitter, a header buffer, a data buffer, and a packet combiner. The packet splitter receives the packets. Each of the packets includes a packet header and packet data. The packet splitter separates the packet header from the packet data for each of the packets. The header buffer stores the packet headers and the data buffer stores the packet data. The packet combiner reassembles the packets from the packet headers in the header buffer and the packet data in the data buffer and removes gaps from the reassembled packets.

According to another aspect of the invention, a system that operates in first and second modes to remove gaps from streams of data is provided. The system includes handshake logic, a first multiplexer, a byte packer, a memory, a second multiplexer, and a third multiplexer. The handshake logic obtains a header portion and a body portion of a data unit corresponding to one of the data streams and reassembles the data stream from the header and body portions. The first multiplexer multiplexes the reassembled data stream from the handshake logic. The byte packer removes gaps from data units of the multiplexed data stream from the first multiplexer to generate a gap-free data stream. The memory temporarily buffers the gap-free data stream. The second and third multiplexers multiplex the gap-free data stream in the first and second modes, respectively.

According to yet another aspect of the invention, a network device includes a switching fabric and a plurality of packet processors connected to the switching fabric. Each of the packet processors includes a stream map, a first multiplexer, a byte packer, a memory, a second multiplexer, and a third multiplexer. The stream map provides stream identifiers that correspond to a plurality of streams of packets. The first multiplexer multiplexes packets based on the stream identifiers. The byte packer removes gaps from the multiplexed packets from the first multiplexer to generate gap-free packets. The memory stores and outputs the gap-free packets based on the stream identifiers. The second and third multiplexers multiplex one or more of the gap-free packets based on the stream identifiers.

According to a further aspect of the invention, a network device includes a switching fabric and a plurality of packet processors connected to the switching fabric. Each of the packet processors includes a stream map, a memory, first and second multiplexers, and first and second byte packers. The stream map provides stream identifiers that correspond to a plurality of streams of packets. The memory stores and outputs packets based on the stream identifiers. The first multiplexer multiplexes one or more of the stored packets based on the stream identifiers. The first byte packer removes gaps from the multiplexed packets from the first multiplexer to generate gap-free packets. The second multiplexer multiplexes one or more of the stored packets based on the stream identifiers. The second byte packer removes gaps from the multiplexed packets from the second multiplexer to generate gap-free packets.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

Systems and methods consistent with principles of the invention remove gaps from packets within streams of different bandwidths. The systems and methods may be implemented within the output logic of a network device, such as a router. The output logic may eliminate the gaps that may occur during processing of packets by the network device. The output logic may use the same mechanisms to eliminate gaps in packets within streams of any bandwidth.

Exemplary System Configuration

Figure 1:
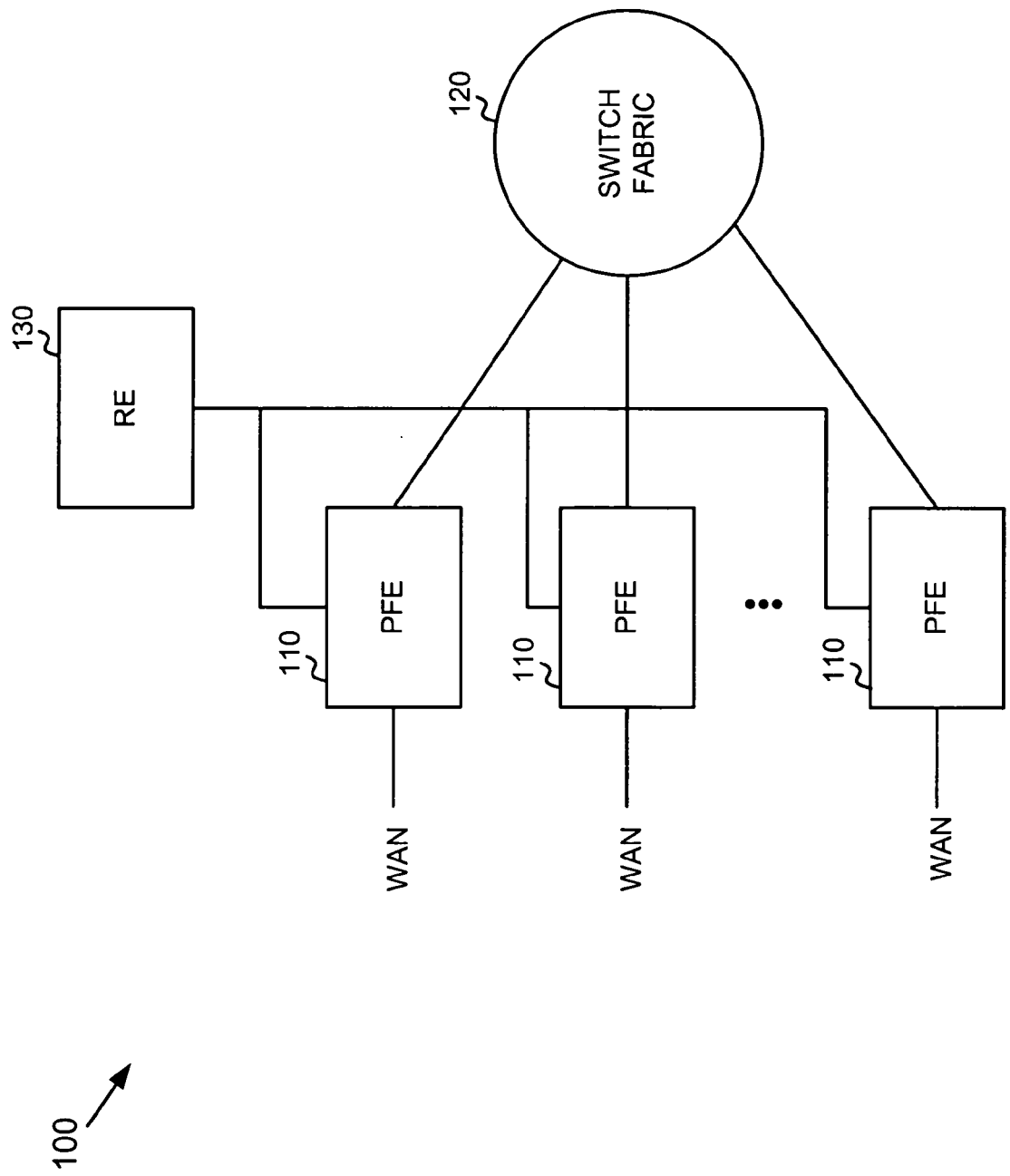
FIG. 1 is a block diagram illustrating an exemplary routing system in which systems and methods consistent with principles of the invention may be implemented.

FIG. 1 is a block diagram illustrating an exemplary routing system 100 in which systems and methods consistent with the principles of the invention may be implemented. System 100 receives a data stream from a physical link, processes the data stream to determine destination information, and transmits the data stream out on a link in accordance with the destination information. System 100 may include packet forwarding engines (PFEs) 110, a switch fabric 120, and a routing engine (RE) 130.

RE 130 performs high level management functions for system 100. For example, RE 130 communicates with other networks and systems connected to system 100 to exchange information regarding network topology. RE 130 creates routing tables based on network topology information, creates forwarding tables based on the routing tables, and forwards the forwarding tables to PFEs 110. PFEs 110 use the forwarding tables to perform route lookup for incoming packets. RE 130 also performs other general control and monitoring functions for system 100.

PFEs 110 are each connected to RE 130 and switch fabric 120. PFEs 110 receive data at ports on physical links connected to a network, such as a wide area network (WAN). Each physical link could be one of many types of transport media, such as optical fiber or Ethernet cable. The data on the physical link is formatted according to one of several protocols, such as the synchronous optical network (SONET) standard, an asynchronous transfer mode (ATM) technology, or Ethernet.

PFEs 110 may operate upon packet streams of different bandwidths. For example, suppose that a PFE 110 is capable of handling OC-192 worth of bandwidth. In this case, a single stream may use the entire bandwidth or multiple streams may divide up the bandwidth. In one implementation, each stream uses a multiple of OC-3 worth of bandwidth.

PFE 110 processes incoming data by stripping off the data link layer. PFE 110 converts header information from the remaining data into a data structure referred to as a notification. For example, in one embodiment, the data remaining after the data link layer is stripped off is packet data. PFE 110 converts the layer 2 (L2) and layer 3 (L3) packet header information included with the packet data into a notification. PFE 110 may store the information in the notification, some control information regarding the packet, and the packet data in a series of cells. In one embodiment, the notification and the control information are stored in the first two cells of the series of cells.

PFE 110 performs a route lookup using the notification and the forwarding table from RE 130 to determine destination information. PFE 110 may also further process the notification to perform protocol-specific functions, policing, and accounting, and might even modify the notification to form a new notification.

If the destination indicates that the packet should be sent out on a physical link connected to PFE 110, then PFE 110 retrieves the cells for the packet, converts the modified notification information into header information, forms a packet using the packet data from the cells and the header information, and transmits the packet from the port associated with the physical link.

If the destination indicates that the packet should be sent to another PFE via switch fabric 120, then PFE 110 retrieves the cells for the packet, modifies the first two cells with the modified notification and new control information, if necessary, and sends the cells to the other PFE via switch fabric 120. Before transmitting the cells over switch fabric 120, PFE 110 appends a sequence number to each cell, which allows the receiving PFE to reconstruct the order of the transmitted cells. Additionally, the receiving PFE uses the notification to form a packet using the packet data from the cells, and sends the packet out on the port associated with the appropriate physical link of the receiving PFE.

In summary, RE 130, PFEs 110, and switch fabric 120 perform routing based on packet-level processing. PFEs 110 store each packet using cells while performing a route lookup using a notification, which is based on packet header information. A packet might be received on one PFE and go back out to the network on the same PFE, or be sent through switch fabric 120 to be sent out to the network on a different PFE.

Figure 2:
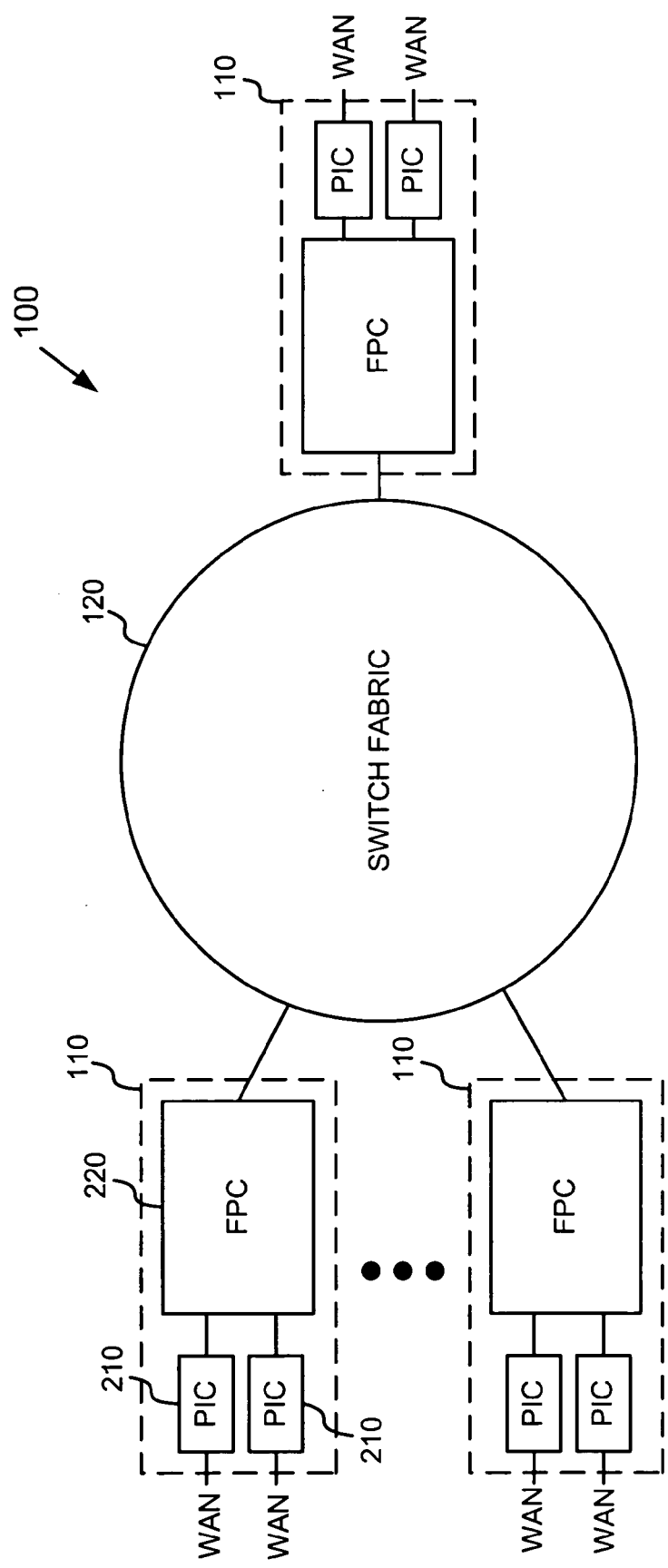
FIG. 2 is a detailed block diagram illustrating portions of the routing system of FIG. 1.

FIG. 2 is a detailed block diagram illustrating portions of routing system 100. PFEs 110 connect to one another through switch fabric 120. Each of the PFEs may include one or more physical interface cards (PICs) 210 and flexible port concentrators (FPCs) 220.

PIC 210 transmits data between a WAN physical link and FPC 220. Different PICs may be designed to handle different types of WAN physical links. For example, one of PICs 210 may be an interface for an optical link while the other PIC may be an interface for an Ethernet link.

FPCs 220 perform routing functions and handle packet transfers to and from PICs 210 and switch fabric 120. For each packet it handles, FPC 220 performs the previously-discussed route lookup function. Although FIG. 2 shows two PICs 210 connected to each of FPCs 220 and three FPCs 220 connected to switch fabric 120, in other embodiments consistent with principles of the invention there can be more or fewer PICs 210 and FPCs 220.

Figure 3:
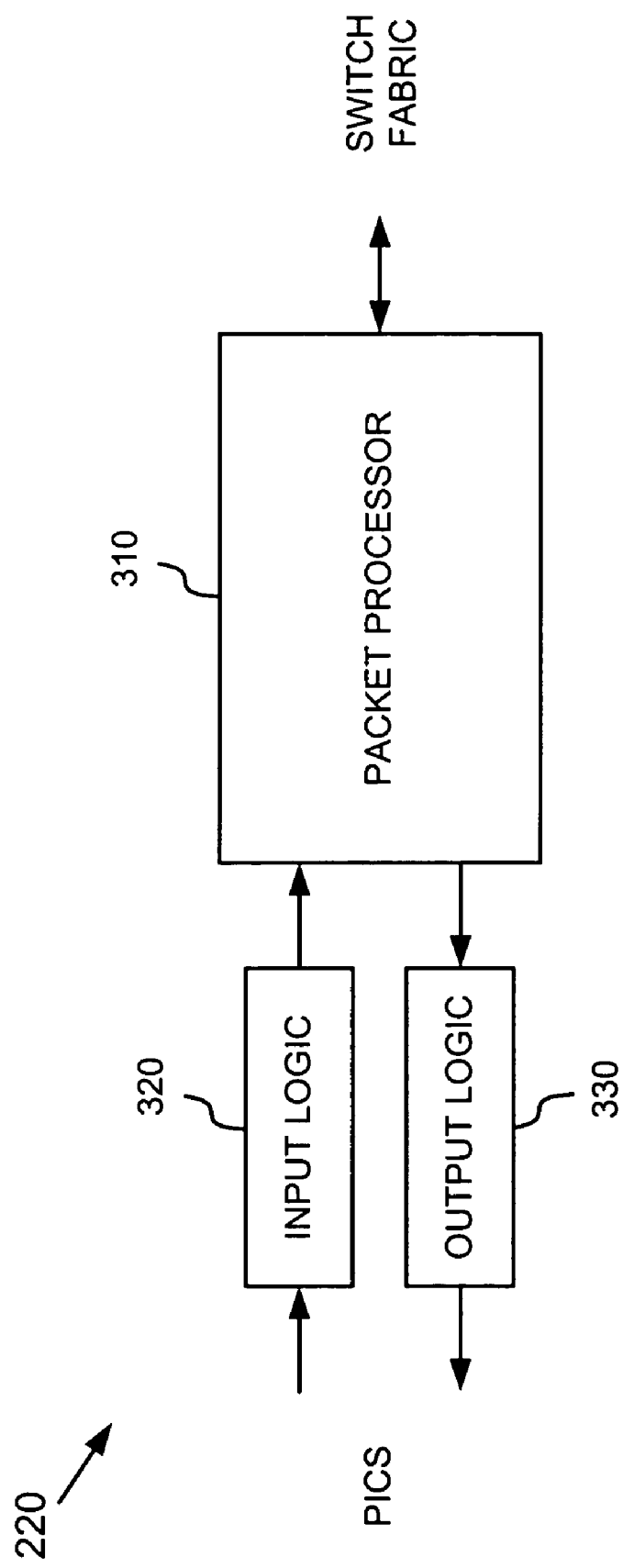
FIG. 3 is an exemplary diagram of a flexible port concentrator of FIG. 2 according to an implementation consistent with principles of the invention.

FIG. 3 is an exemplary diagram of FPC 220 consistent with principles of the invention. FPC 220 includes a packet processor 310, input logic 320, and output logic 330. Packet processor 310 may process packet data received from PICs 210 and create packet data for transmission out to the WAN via PICs 210. Packet processor 510 may also process packet data received from switch fabric 120 and transmit packet data to other PFEs via switch fabric 120.

Input logic 320 may provide initial processing for packet data received from PICs 210. For example, input logic 320 may parse L2 and L3 headers and segment packet data into, for example, 64-byte cells. Input logic 320 may also perform accounting and policing functions on the packet data. Input logic 320 provides the processed packet data to packet processor 310 for further processing with regard to packet transmission.

Output logic 330 provides final processing to packet data received from packet processor 310. For example, output logic 330 may remove intrapacket gaps that may occur during processing of the packet. Output logic 330 may also construct L2 and L3 headers and perform output accounting functions, such as tracking the number of packets or bytes sent per interface. Output logic 330 sends the packet data to PICs 210 for transmission on the WAN.

Output logic 330 may operate upon packet streams of different bandwidths. For example, in one implementation consistent with the principles of the invention, the packet streams may be programmed to OC-3 granularity.

Figure 4:
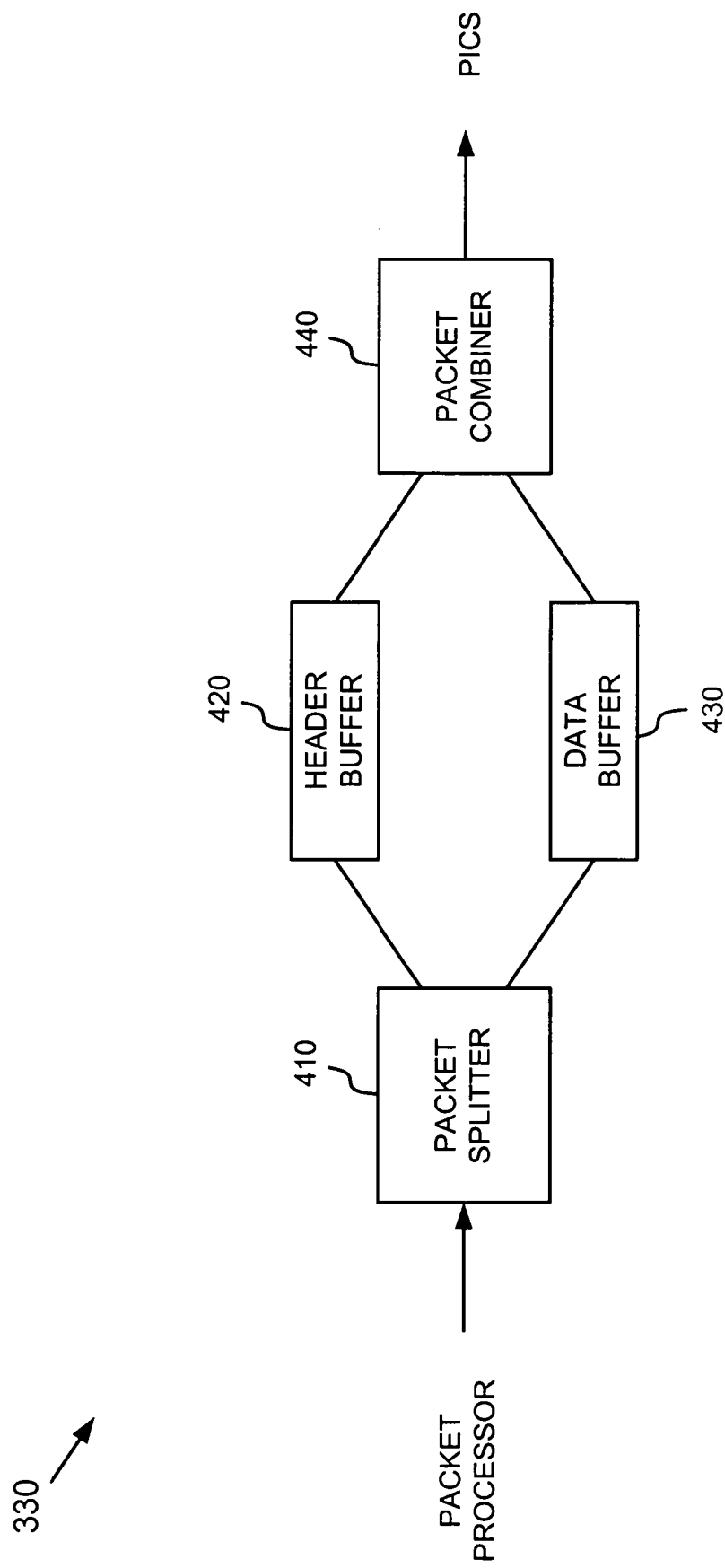
FIG. 4 is an exemplary diagram of the output logic of FIG. 3.

FIG. 4 is an exemplary diagram of output logic 330 in an implementation consistent with principles of the invention. Output logic 330 may include a packet splitter 410, a header buffer 420, a data buffer 430, and a packet combiner 440. Packet splitter 410 receives packets from packet processor 310 and, for each of the packets, separates the packet header from the remainder of the packet (e.g., packet data). For example, packet splitter 410 may remove the first 10–28 bytes of the packet. Packet splitter 410 sends the packet headers to header buffer 420 and the packet data to data buffer 430. Packet splitter 410 may also provide byte information to header buffer 420, such as size in terms of bytes of packet data stored in data buffer 430.

Header buffer 420 processes the packet headers and stores them in a buffer. For example, header buffer 420 may modify the packet headers creating, for example, L2 and/or L3 headers for the packets to be sent out on the WAN. Data buffer 430 may include a buffer, such as a first-in first-out (FIFO) buffer, that stores the packet data from packet splitter 410.

Packet combiner 440 retrieves packet headers and packet data from header buffer 420 and data buffer 430, respectively, assembles packets, and sends them to PICs 210. For example, header buffer 420 may notify packet combiner 440 that it contains a non-empty entry in its buffer. In response, packet combiner 440 may read header and byte information from header buffer 420 and packet data from data buffer 430. In one implementation consistent with the principles of the invention, packet combiner 440 can read 32 bytes of data every two cycles.

Figure 5:
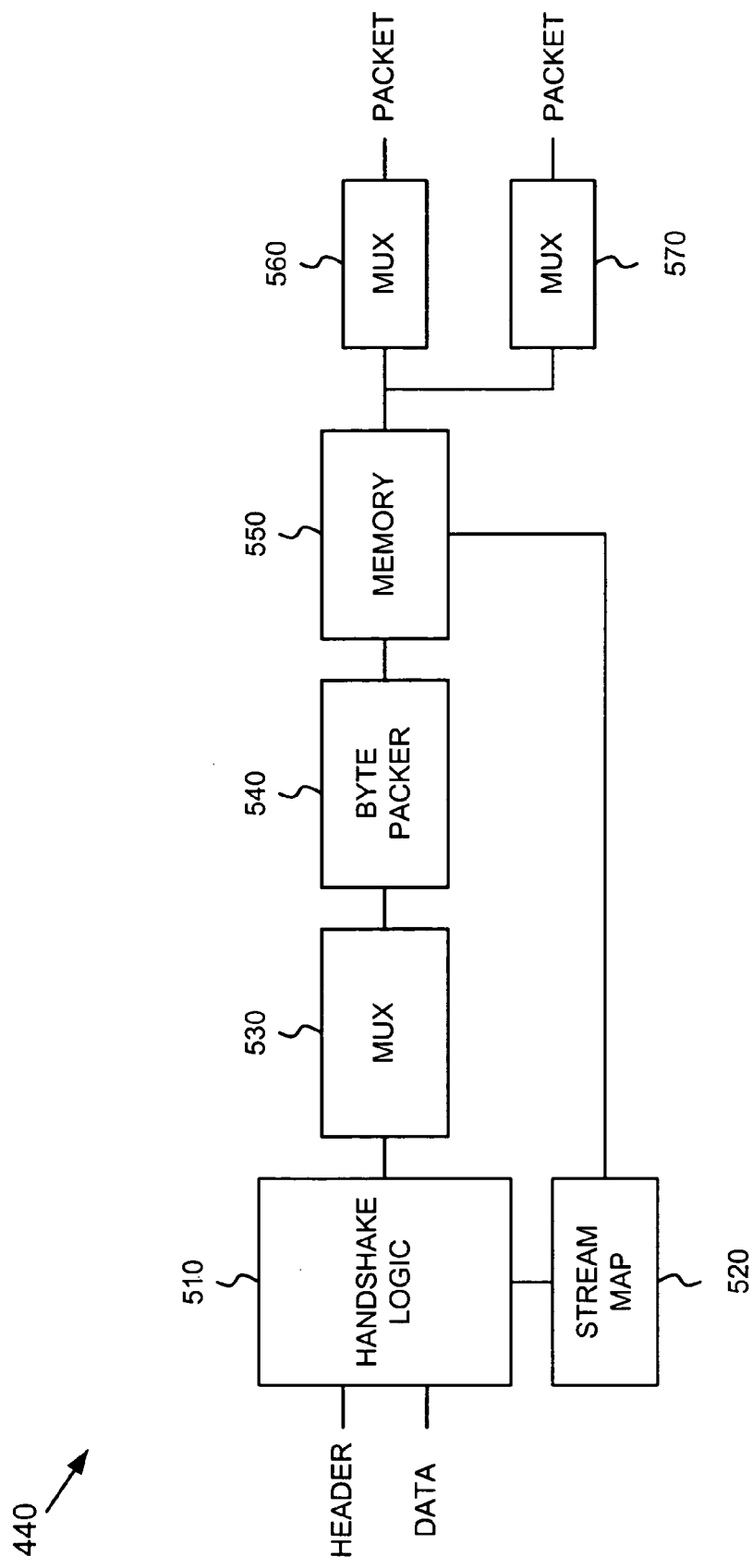
FIG. 5 is an exemplary diagram of the packet combiner of FIG. 4.

FIG. 5 is an exemplary diagram of packet combiner 440 according to an implementation consistent with the principles of the invention. Packet combiner 440 may include handshake logic 510, stream map 520, multiplexer 530, byte packer 540, memory 550, multiplexer 560, and multiplexer 570. Handshake logic 510 may connect to header buffer 420 and data buffer 430 to retrieve header and packet data information and reassemble a packet therefrom. The reassembling of the packet may cause gaps to occur within the packet due to fragmentation.

Figure 6:
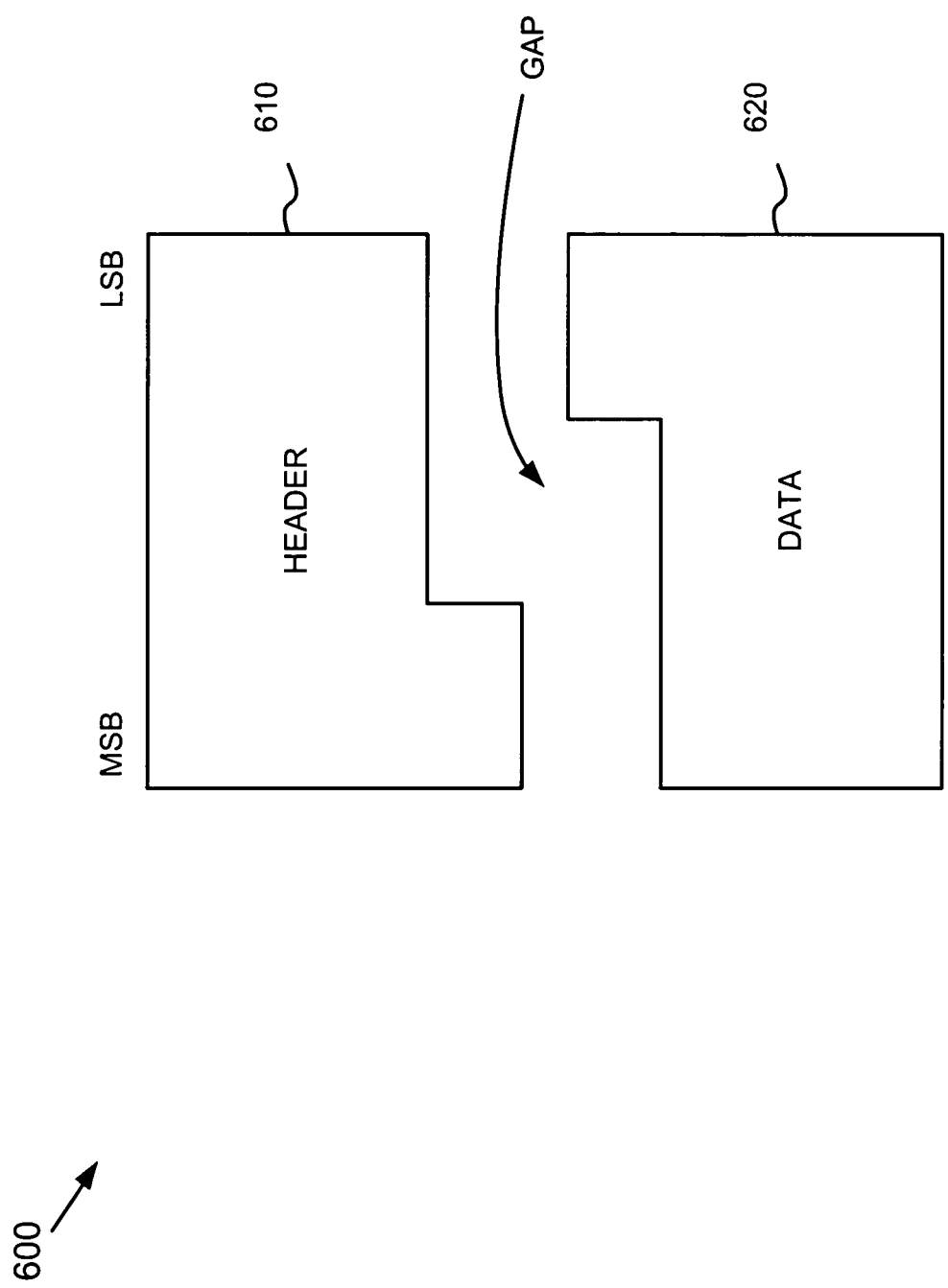
FIG. 6 is an exemplary diagram illustrating a gap in a packet.

FIG. 6 is an exemplary diagram of a packet 600 that contains an intrapacket gap. Assume for purposes of this example, that packet 600 includes a header portion 610 and a data portion 620. In this example, an intrapacket gap was created when the packet was split by packet splitter 410 and stored in header buffer 420 and data buffer 430. Therefore, when handshake logic 510 reads header portion 610 and data portion 620 from header buffer 420 and data buffer 430, respectively, a gap exists between the end of header portion 610 and the beginning of data portion 620.

Returning to FIG. 5, stream map 520 may include an arbiter, such as a time division multiple access (TDMA)-based arbiter, that controls the order in which packet streams are processed by output logic 440. Stream map 520 may use a stream identifier (ID) to control processing of the packet streams by the other components of packet combiner 440. In this way, the packet combiner 440 may be considered a context-switched system that operates based on the stream ID from stream map 520.

In response to the stream ID, handshake logic 510 may read packet header and data information from header buffer 420 and data buffer 430, respectively, reassemble the packet therefrom, and output the packet, along with the stream ID, to multiplexer 530.

Multiplexer 530 may include a 3:2 multiplexer that receives packet information from handshake logic 510 and provides an output to byte packer 540. In one implementation, multiplexer 530 receives packet information on a 32 byte data path and outputs the packet information to byte packer 540 on a 24 byte data path. Multiplexer 530 may operate based on a stream ID that propagates along with the other packet information. The multiplexing by multiplexer 530 may cause additional gaps to be introduced into the packet.

Byte packer 540 may include conventional byte packing mechanisms that process non-contiguous valid bytes of data, such as valid bytes interspersed with invalid bytes (or gaps), to generate contiguous bytes of valid data. Byte packer 540 may receive the packet information from multiplexer 530 and remove the intrapacket gaps therefrom. Byte packer 540 may then store the packet information in memory 550.

Figure 7:
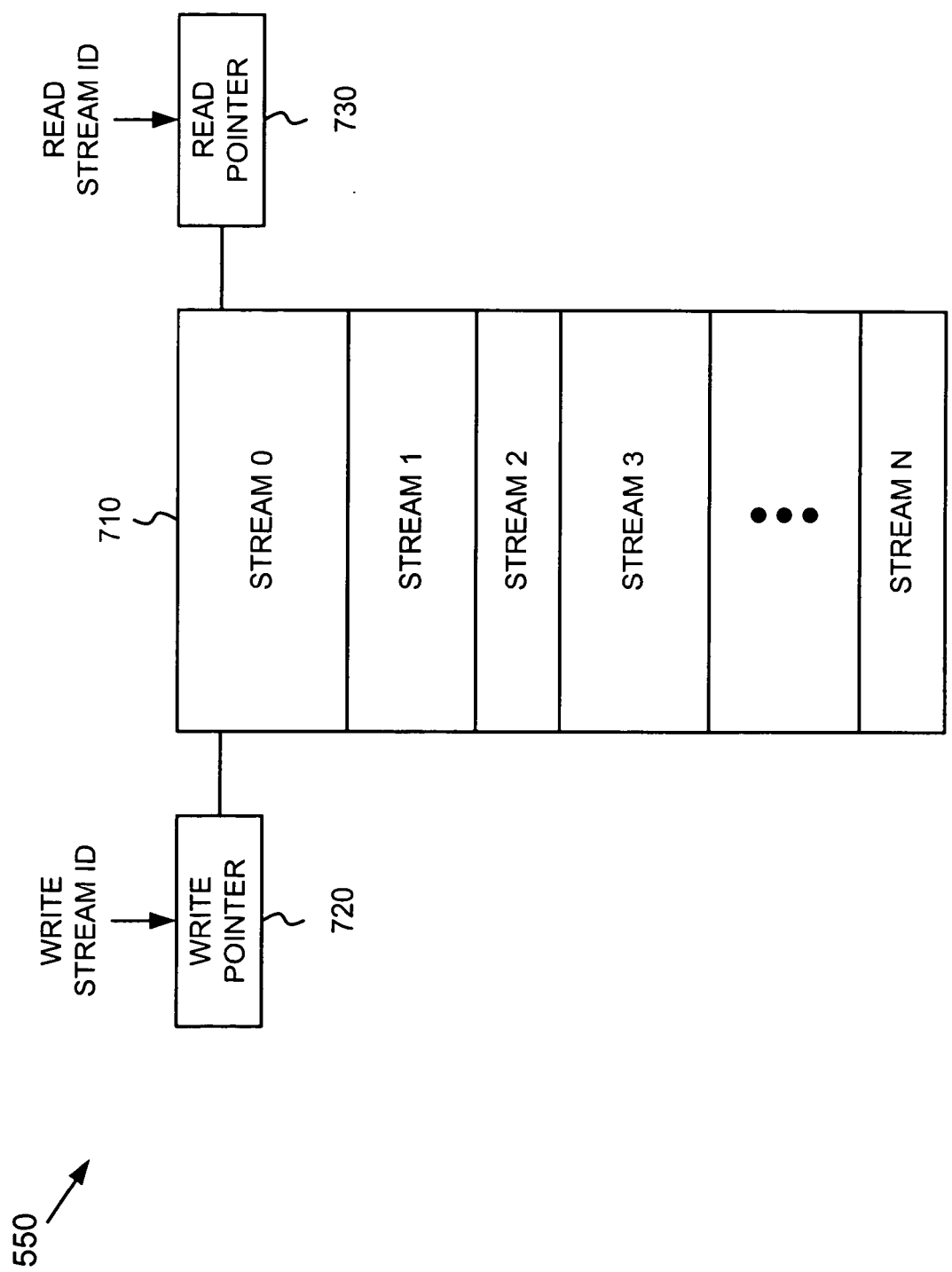
FIG. 7 is an exemplary diagram of the memory of FIG. 5.

Memory 550 may include a partitionable FIFO buffer that stores packet information based on a write pointer and outputs packet information based on a read pointer. FIG. 7 is an exemplary diagram of memory 550 according to an implementation consistent with the principles of the invention. Memory 550 includes a FIFO buffer 710, a write pointer register 720, and a read pointer register 730.

The FIFO 710 may be partitioned into different sized blocks that correspond to each of the streams. For example, each of the partitioned blocks may function as a circular FIFO buffer for the corresponding stream. Data may be written to a partitioned block based on a write pointer in write pointer register 720 and read from a partitioned block based on a read pointer in read pointer register 730.

Write pointer register 720 may store one or more write pointers. Each of the write pointers may be based on a stream ID that propagates from handshake logic 510 along with the other packet information. Read pointer register 730 may store one or more read pointers. Each of the read pointers may be based on a stream ID from stream map 520.

Assume, for example, that there are four possible streams. In this case, the write stream IDs may be provided to write pointer register 720 in the order: 0000 1111 2222 3333 0000 . . . The read stream IDs may be provided to read pointer register 730 in the order: 0123 0123 0123 0123 0123 . . . FIFO 710 may use the read and write stream IDs in determining from which of the partitioned blocks to read and write data, respectively.

Returning to FIG. 5, multiplexer 560 may include a 2:1 multiplexer that receives packet information from memory 560 on a 24 byte data path and provides an output on a 12 byte data path. Multiplexer 560 may operate based on a stream ID that propagates along with the other packet information. The multiplexing by multiplexer 560 introduces no intrapacket gaps. As a result, the packet may be transferred to the corresponding PIC 210 without gaps for transmission on the WAN.

Multiplexer 570 may include a 3:1 multiplexer that receives packet information from memory 570 on a 24 byte data path and provides an output on an 8 byte data path. Multiplexer 570 may also operate based on a stream ID that propagates along with the other packet information. The multiplexing by multiplexer 570 introduces no intrapacket gaps. As a result, the packet may be transferred to the corresponding PIC 210 without gaps for transmission on the WAN.

Exemplary Processing

Figure 8:
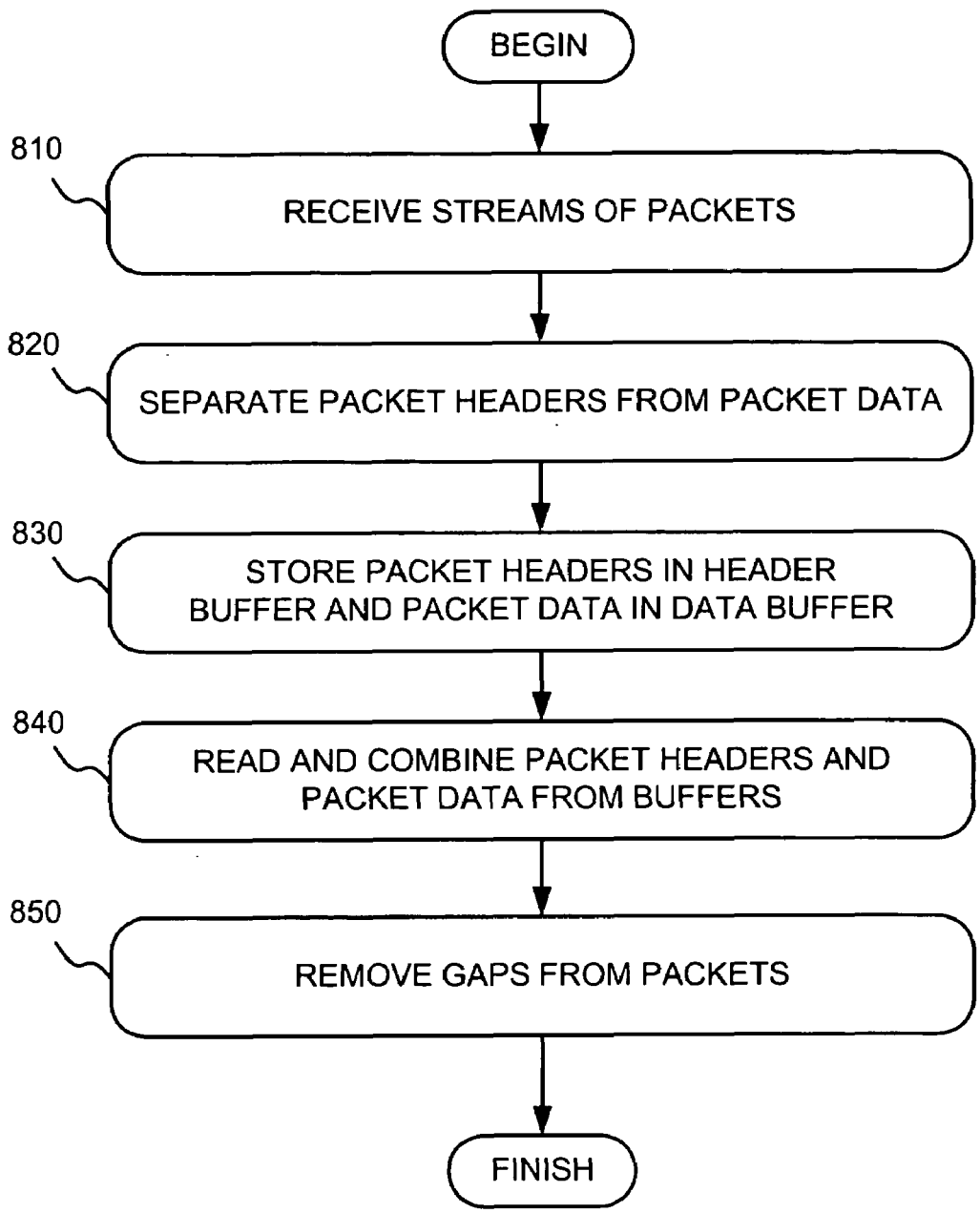
FIG. 8 is a flowchart of exemplary processing by the output logic of FIG. 4 according to an implementation consistent with the principles of the invention.

FIG. 8 is a flowchart of exemplary processing by output logic 330 according to an implementation consistent with the principles of the invention. Processing may begin with output logic 330 receiving streams of packets from packet processor 310. Output logic 330 may operate in different modes depending upon the type of PIC 210 to which a packet stream is destined. The mode may be software programmable and a particular mode determined based on a stream ID or other identifying information.

Packet splitter 410 may receive the packets and separate the packet headers from the packet data (acts 810 and 820). For example, packet splitter 410 may remove the first 10–28 bytes of the packet for the packet header. Packet splitter 410 may then store the packet headers in header buffer 420 and the packet data in data buffer 430 (act 830). Packet splitter 410 may also provide byte information to header buffer 420. For example, packet splitter 410 may identify the number of bytes of packet data stored in data buffer 430 and provide this byte information to header buffer 420.

Header buffer 420 may process the packet headers or simply store them in a buffer. For example, header buffer 420 may create L2 and/or L3 headers for the packets or otherwise process the headers.

Packet combiner 440 may retrieve packet headers and packet data from header buffer 420 and data buffer 430, respectively, and reassemble the packets therefrom (act 840). For example, packet combiner 440 may ask header buffer 420 whether it has any information relating to a particular stream. Header buffer 420 may notify packet combiner 440 that it contains a non-empty entry in its buffer relating to the stream. In response, packet combiner 440 may read header and byte information from header buffer 420 and packet data from data buffer 430. In one implementation consistent with the principles of the invention, packet combiner 440 can read 32 bytes of data every two cycles.

Figure 9:
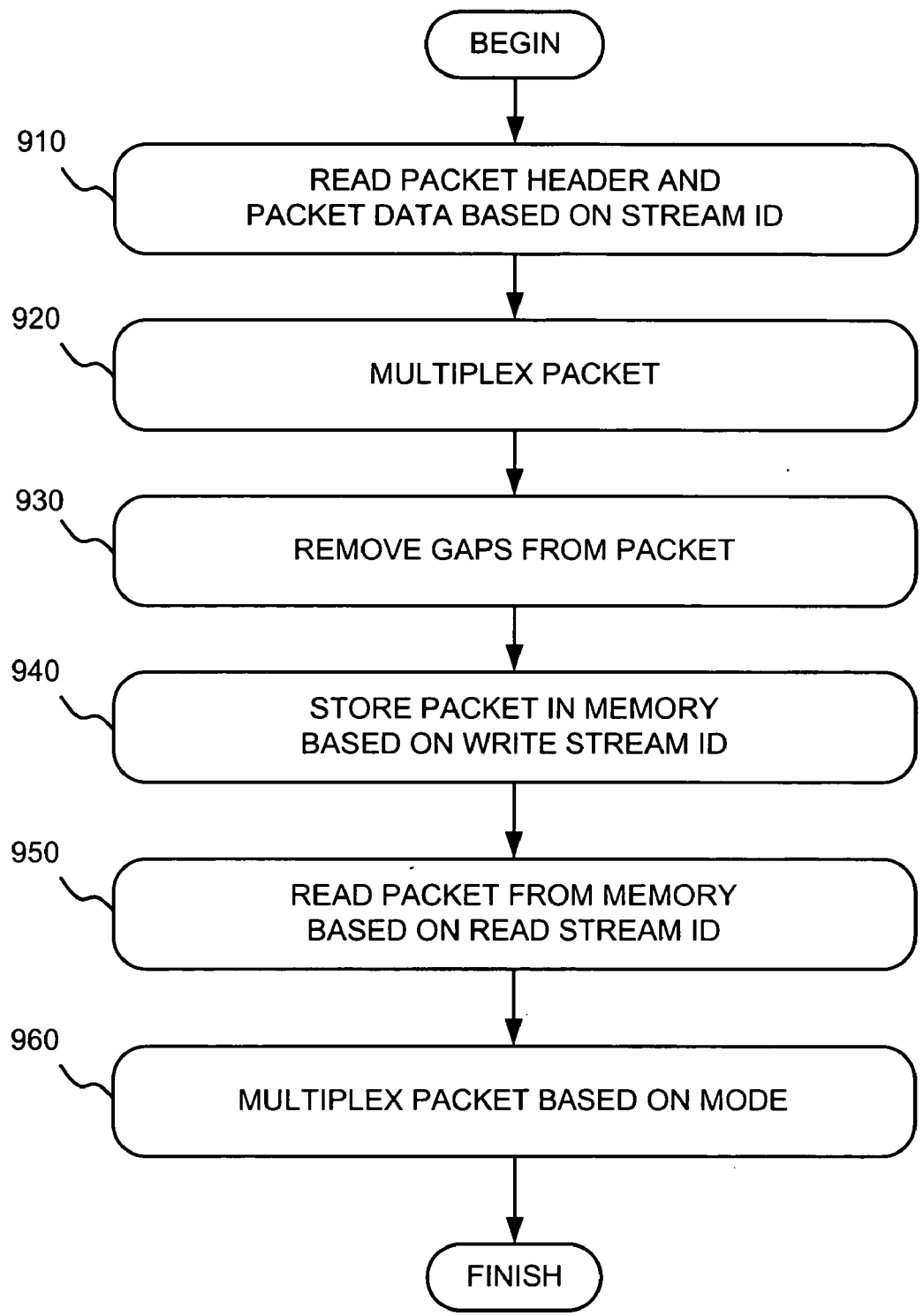
FIG. 9 is a flowchart of exemplary processing by the packet combiner of FIG. 5 to remove intrapacket gaps according to an implementation consistent with the principles of the invention.

During processing of the packets, intrapacket gaps may appear. Packet combiner 440 may operate upon the packets to remove the gaps (act 850). FIG. 9 is a flowchart of exemplary processing by packet combiner 440 to remove gaps in the packets according to an implementation consistent with the principles of the invention. Assume for purposes of this example that packet combiner 440 operates in one of two modes based on the stream ID. In the first mode, packet combiner 440 outputs one or more packets to a PIC 210 connected to multiplexer 560. In the second mode, packet combiner 440 outputs one or more packets to a PIC 210 connected to multiplexer 570.

Processing may begin with handshake logic 510 receiving a stream ID from stream map 520. In response to the stream ID, handshake logic 510 may read packet header and packet data from header buffer 420 and data buffer 430, respectively, for a packet corresponding to the stream ID (act 910). Handshake logic 510 may reassemble a packet from the packet header and packet data and provide the packet to multiplexer 530. The resultant packet may include intrapacket gaps.

Multiplexer 530 receives packets from handshake logic 510 and multiplexes them, possibly based on the stream ID, and provides an output to byte packer 540 (act 920). For example, multiplexer 530 may perform 3:2 multiplexing on the bytes of data and provide its output on a 24 byte data path. Intrapacket gaps may be introduced into the packet as a result of the multiplexing.

Byte packer 540 operates upon the bytes of the packet to remove the intrapacket gaps (act 930). Byte packer 540 may use conventional byte packing techniques to remove the gaps. Byte packer 540 may then store the packet in memory 550 based on a write stream ID propagated along with the packet (act 940).

The packet may then be read from memory 550 based upon a read stream ID from stream map 520 (act 950). The reading from memory 550 may be different depending upon the mode. If operating in the first mode, for example, a read opportunity to read a packet from memory 550 may exist one out of every two cycles. In this case, the packet read from memory 550 is operated upon by multiplexer 560. If operating in the second mode, however, a read opportunity may exist one out of every three cycles. In this case, the packet read from memory 550 is operated upon by multiplexer 570.

In the first mode, multiplexer 560 may perform 2:1 multiplexing on the packet to output the packet on a 12 byte data path to the corresponding PIC 210 (act 960). In the second mode, multiplexer 570 may perform 3:1 multiplexing on the packet to output the packet on an 8 byte data path to the corresponding PIC 210 (act 960). Multiplexers 560 and 570 provide the packet to the corresponding PICs 210 without intrapacket gaps. PICs 210 may provide additional processing to the packets and output them on the WAN.

Other Implementations

Systems and methods have been described for removing intrapacket gaps during processing of packets from multiple packet streams, while sharing gap-removing mechanisms among the streams. In other implementations consistent with principles of the invention, yet other systems may be used. In another implementation, for example, each outgoing path may have its own gap-removing mechanisms.

Figure 10:
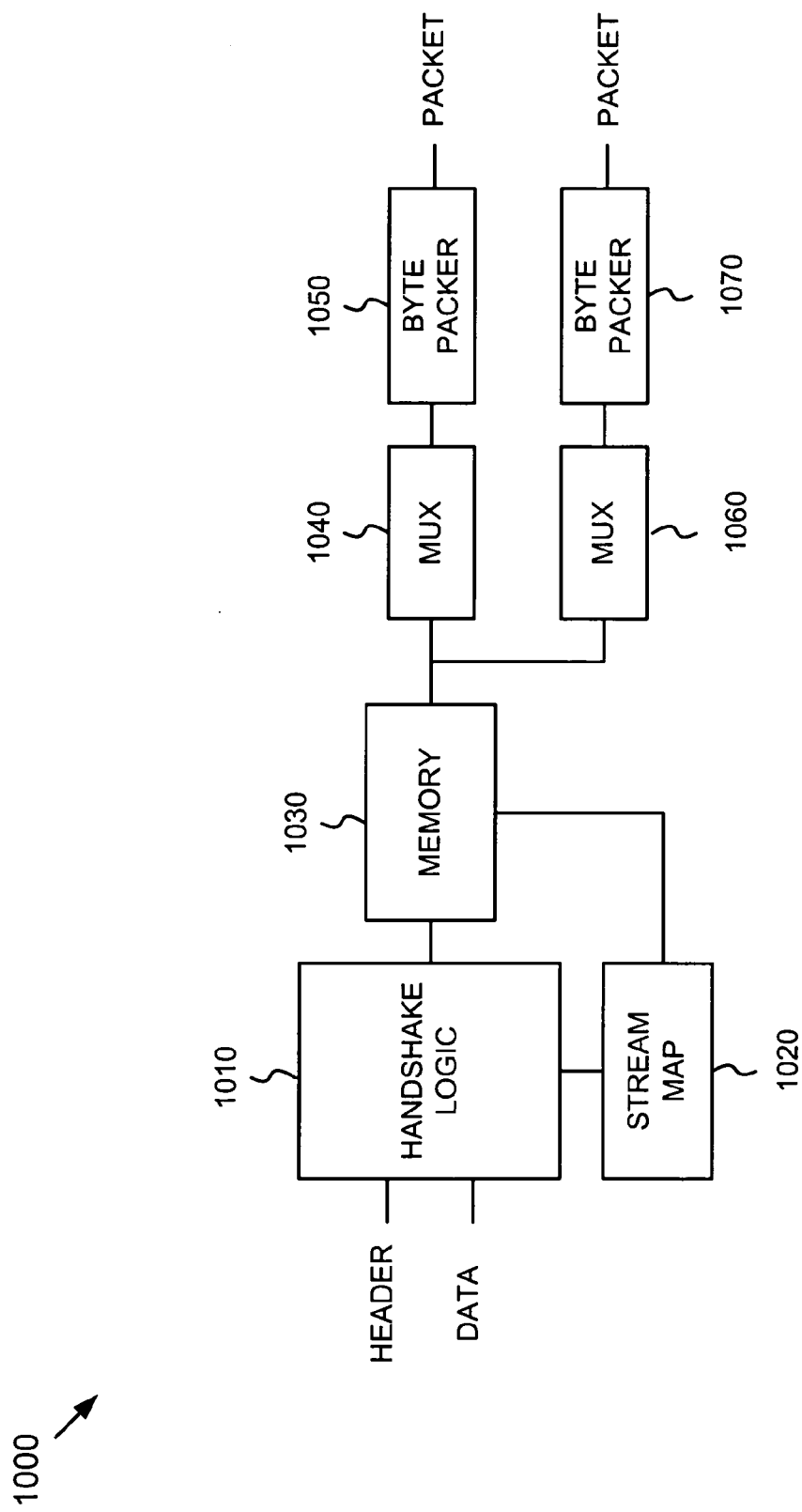
FIG. 10 is an exemplary diagram of a system according to an alternate implementation consistent with the principles of the invention.

In yet another implementation, multiplexer 530 may be eliminated. FIG. 10 is an exemplary diagram of such a system 1000. System 1000 includes handshake logic 1010, stream map 1020, memory 1030, multiplexer 1040, byte packer 1050, multiplexer 1060, and byte packer 1070. Handshake logic 1010, stream map 1020, memory 1030, and byte packers 1050 and 1070 may be configured similar to handshake logic 510, stream map 520, memory 550, and byte packer 540, respectively, described above with regard to FIG. 5. In this case, however, memory 1030 may provide its output on a 16 byte data path.

Multiplexer 1040 may include a 3:2 multiplexer that multiplexes the packets from memory 1030 and outputs packets on a 12 byte data path. Byte packer 1050 may operate upon the packets to remove intrapacket gaps.

Multiplexer 1060 may include a 2:1 multiplexer that multiplexes the packets from memory 1030 and outputs packets on an 8 byte data path. Byte packer 1070 may operate upon the packets to remove intrapacket gaps.

CONCLUSION

Systems and methods consistent with the principles of the invention may provide a context switched, gap free interface that efficiently shares logic between streams of different bandwidths. Although described in the context of a routing system, concepts consistent with the principles of the invention can be implemented in any system that processes and buffers data.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, output logic 330 has been described as including data paths of a particular bandwidth. The actual bandwidth of these data paths may differ in other implementations consistent with the principles of the invention.

Also, the foregoing systems and methods have been described as operating upon intrapacket gaps. These systems and methods may also be applicable to interpacket gaps.

No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the claims and their equivalents.

What is claimed:

1. A system for removing gaps from streams of packets, comprising:
   a packet splitter configured to:
      receive the packets, each of the packets including a packet header and packet data, and
      separate the packet header from the packet data for each of the packets;
   a header buffer configured to store the packet headers;
   a data buffer configured to store the packet data; and
   a packet combiner configured to:
      reassemble the packets from the packet headers in the header buffer and the packet data in the data buffer, the reassembling causing gaps to occur between the packet headers and the packet data within the reassembled packets, and
      remove the gaps from the reassembled packets.

2. The system of claim 1, wherein the packet splitter is further configured to:
   identify a number of bytes of packet data stored in the data buffer, and
   provide the identified number of bytes to the header buffer.

3. The system of claim 1, wherein the streams include packet streams of different bandwidths.

4. The system of claim 1, wherein the packet combiner includes:
   a multiplexer configured to multiplex the reassembled packets, and
   a byte packer configured to remove the gaps from the multiplexed packets.

5. The system of claim 1, wherein the packet combiner includes:
   a stream map configured to output stream identifiers corresponding to the streams, and handshake logic configured to:
      read the packet headers from the header buffer and the packet data from the data buffer based on the stream identifiers, and
      reassemble the packets using the packet headers and the packet data.

6. The system of claim 1, wherein the packet combiner includes:
   a memory configured to:
      store the reassembled packets based on write stream identifiers from a stream map, and
      output the reassembled packets based on read stream identifiers from the stream map.

7. The system of claim 6, wherein the memory includes:
   a buffer that includes a plurality of blocks corresponding to the streams,
   a write pointer register configured to store a plurality of the write stream identifiers, and
   a read pointer register configured to store a plurality of the read stream identifiers.

8. The system of claim 6, wherein the packet combiner further includes:
   a first multiplexer configured to multiplex one or more of the reassembled packets output by the memory based on the write or read stream identifiers, and
   a second multiplexer configured to multiplex one or more of the reassembled packets output by the memory based on the write or read stream identifiers.

9. The system of claim 8, wherein the first multiplexer includes a 2:1 multiplexer and the second multiplexer includes a 3:1 multiplexer.

10. The system of claim 8, wherein the first multiplexer includes a 3:2 multiplexer and the second multiplexer includes a 2:1 multiplexer.

11. The system of claim 8, wherein the packet combiner further includes:
    a first byte packer configured to remove gaps from the multiplexed packets from the first multiplexer, and
    a second byte packer configured to remove gaps from the multiplexed packets from the second multiplexer.

12. The system of claim 8, wherein the packet combiner further includes:
    a third multiplexer configured to multiplex the reassembled packets, and
    a byte packer configured to:
       remove gaps from the multiplexed packets from the third multiplexer to create gap-free packets, and
       store the gap-free packets in the memory.

13. The system of claim 1, wherein the packet combiner includes:
    handshake logic configured to:
       read the packet headers from the header buffer and the packet data from the data buffer, and
       reassemble the packets from the packet headers and the packet data,
    a first multiplexer configured to multiplex the reassembled packets from the handshake logic,
    a byte packer configured to remove gaps from the multiplexed packets from the first multiplexer to generate gap-free packets,
    a memory configured to temporarily buffer the gap-free packets,
    a second multiplexer configured to multiplex one or more of the gap-free packets from the memory, and
    a third multiplexer configured to multiplex one or more of the gap-free packets from the memory.

14. The system of claim 13, wherein the first multiplexer includes a 3:2 multiplexer, the second multiplexer includes a 2:1 multiplexer, and the third multiplexer includes a 3:1 multiplexer.

15. The system of claim 1, wherein the packet combiner further includes:
a stream map configured to output stream identifiers corresponding to the streams, the stream identifiers controlling processing of the packets by the packet combiner.

16. A system for removing gaps from streams of packets, comprising:
means for receiving a packet including a packet header and packet data;
means for separating the packet header from the packet data for the packet;
means for separately storing the packet header and the packet data;
means for reassembling the packet based on the stored packet header and the stored packet data, the reassembling causing a gap to occur within the packet between the packet header and the packet data; and
means for removing the gap from the reassembled packet.

17. A method for removing gaps from streams of packets, comprising:
obtaining the streams of packets, each of the packets including a packet header and packet data;
separating the packet header from the packet data for each of the packets;
separately storing the packet headers and the packet data;
reassembling the packets using the stored packet headers and the stored packet data, the reassembling causing gaps to occur within the reassembled packets between the packet headers and the packet data; and
removing the gaps from the reassembled packets.

18. The method of claim 17, wherein the removing gaps includes:
multiplexing the reassembled packets based on a stream identifier, and
removing the gaps from the multiplexed packets using a byte packing technique.

19. The method of claim 17, wherein the reassembling includes:
receiving stream identifiers corresponding to the streams,
reading the packet headers and the packet data based on the stream identifiers, and
reconstructing the packets from the packet headers and the packet data.

20. The method of claim 17, further comprising:
storing the reassembled packets in a memory based on write stream identifiers corresponding to the streams; and
outputting the reassembled packets from the memory based on read stream identifiers corresponding to the streams.

21. The method of claim 20, wherein the storing the reassembled packets includes:
writing each of the reassembled packets to a block of the memory that corresponds to the stream to which the reassembled packet belongs.

22. The method of claim 17, further comprising:
multiplexing one or more of the reassembled packets by a first multiplexer based on stream identifiers corresponding to the streams; and
multiplexing one or more of the reassembled packets by a second multiplexer based on stream identifiers corresponding to the streams.

23. The method of claim 22, further comprising:
subjecting the multiplexed packets from the first multiplexer to a first byte packing process; and
subjecting the multiplexed packets from the second multiplexer to a second byte packing process.

24. The method of claim 17, wherein the removing gaps includes:
subjecting the reassembled packets to a byte packing process to create gap-free packets.

25. A system that operates in first and second modes to remove gaps from streams of data, comprising:
handshake logic configured to:
obtain a header portion and a body portion of a data unit corresponding to one of the data streams, and
reassemble the data stream from the header and body portions;
a first multiplexer configured to multiplex the reassembled data stream from the handshake logic;
a byte packer configured to remove gaps from data units within the multiplexed data stream to generate a gap-free data stream;
a memory configured to temporarily buffer the gap-free data stream;
a second multiplexer configured to multiplex the gap-free data stream in the first mode; and
a third multiplexer configured to multiplex the gap-free data stream in the second mode.

26. The system of claim 25, wherein the first multiplexer includes a 3:2 multiplexer, the second multiplexer includes a 2:1 multiplexer, and the third multiplexer includes a 3:1 multiplexer.

27. The system of claim 25, further comprising:
a stream map configured to output stream identifiers corresponding to the data streams, the stream identifiers controlling processing of the data streams by the system.

28. A system that operates in first and second modes to remove gaps from streams of data, comprising:
means for obtaining a header portion and a body portion of a data unit corresponding to one of the data streams;
means for reassembling the data stream from the header and body portions;
means for multiplexing the reassembled data stream by a first multiplexer;
means for removing gaps from data units of the multiplexed data stream from the first multiplexer to generate a gap-free data stream;
means for multiplexing the gap-free data stream by a second multiplexer in the first mode; and
means for multiplexing the gap-free data stream by a third multiplexer in the second mode.

29. A method for removing gaps from streams of data in first and second modes, comprising:
receiving a header portion and a body portion corresponding to one of the data streams;
reassembling the data stream from the header and body portions;
multiplexing the reassembled data stream by a first multiplexer;
removing gaps from the multiplexed data stream from the first multiplexer to generate a gap-free data stream;
multiplexing the gap-free data stream by a second multiplexer in the first mode; and
multiplexing the gap-free data stream by a third multiplexer in the second mode.

30. A network device, comprising:

a switching fabric; and a plurality of packet processors connected to the switching fabric, each of the packet processors including:
- a stream map configured to provide stream identifiers corresponding to a plurality of streams of packets;
- a first multiplexer configured to multiplex packets based on the stream identifiers;
- a byte packer configured to remove gaps from the multiplexed packets from the first multiplexer to generate gap-free packets;
- a memory configured to store and output the gap-free packets based on the stream identifiers;
- a second multiplexer configured to multiplex one or more of the gap-free packets based on the stream identifiers; and
- a third multiplexer configured to multiplex one or more of the gap-free packets based on the stream identifiers.

31. A network device, comprising:

a switching fabric; and a plurality of packet processors connected to the switching fabric, each of the packet processors including:
- a stream map configured to provide stream identifiers corresponding to a plurality of streams of packets;
- a memory configured to store and output packets based on the stream identifiers;
- a first multiplexer configured to multiplex one or more of the stored packets based on the stream identifiers;
- a first byte packer configured to remove gaps from the multiplexed packets from the first multiplexer to generate gap-free packets;
- a second multiplexer configured to multiplex one or more of the stored packets based on the stream identifiers; and
- a second byte packer configured to remove gaps from the multiplexed packets from the second multiplexer to generate gap-free packets.

* * * * *

UNITED STATES PATENT AND TRADEMARK OFFICE
CERTIFICATE OF CORRECTION

PATENT NO. : 6,952,738 B1
DATED : October 4, 2005
INVENTOR(S) : Brian Gaudet

It is certified that error appears in the above-identified patent and that said Letters Patent is hereby corrected as shown below:

Column 11,
Line 11, delete the words "streams of".

Signed and Sealed this

Twenty-second Day of November, 2005

JON W. DUDAS
*Director of the United States Patent and Trademark Office*